United States Patent [19]

Spease

[11] Patent Number: 4,860,609

[45] Date of Patent: Aug. 29, 1989

[54] SEALED ROTATING END FITTING FOR A FLEXIBLE CABLE

[75] Inventor: Arthur L. Spease, Bloomfield Hills, Mich.

[73] Assignee: Teleflex Incorporated, Limerick, Pa.

[21] Appl. No.: 238,418

[22] Filed: Aug. 31, 1988

[51] Int. Cl.[4] .............................................. F16C 1/10
[52] U.S. Cl. ................................. 74/502.4; 74/502.6
[58] Field of Search ................ 74/500.5, 502.4, 502.5, 74/502.6

[56] References Cited

U.S. PATENT DOCUMENTS 3,354,742 11/1967 Tschanz et al.

Primary Examiner—Gary L. Smith
Assistant Examiner—Flemming Saether
Attorney, Agent, or Firm—Reising, Ethington, Barnard, Perry & Milton

[57] ABSTRACT

A motion transmitting remote control assembly for the type for transmitting forces along a curved path by a flexible motion transmitting core element. The assembly includes a conduit (12). The conduit slideably supports a flexible motion transmitting core element (14). A connector member (16) included an annular radially extending flange (18) extends from the connector member (16). The assembly (10) further includes an end fitting (30) having a cylindrical portion (32). The cylindrical portion (32) is positioned over the outer surface of the connector member (16) such that the cylindrical portion (32) abuts the flange (18). A retainer (38) simultaneously engages the end fitting (30) and the flange (18) for preventing relative axial movement between the conduit (12) and the end fitting (30) while permitting relative rotational movement therebetween.

9 Claims, 2 Drawing Sheets

SEALED ROTATING END FITTING FOR A FLEXIBLE CABLE

TECHNICAL FIELD

The subject invention relates to motion transmitting remote control assemblies of the type for transmitting forces in a curved path by a flexible motion transmitting core element.

BACKGROUND OF THE INVENTION

Remote control assemblies utilizing flexible motion transmitting core elements are typically used in automotive, marine, and aircraft environments. Such an assembly includes a conduit for supporting a core element. For example, such an assembly is typically used in an automobile to control such things as the throttle (i.e., cruise control), heater, vents and the like. The conduit is typically secured to an end fitting which end fitting is secured to a support structure. The end fitting must engage and be secured to the conduit so as to prevent relative axial movement between the conduit and the end fitting to prevent the conduit from being pulled from the end fitting which is secured to the support structure. It is further desirable to attach the conduit to the end fitting while allowing relative rotation rotational movement between the conduit and the end fitting. By allowing relative rotational movement, installation of the assembly is facilitated.

U.S. Pat. No. 3,354,742 to Tschanz et al issued Nov. 28, 1967 discloses a motion transmitting remote control assembly. The assembly includes a retainer having a bulbous portion. The retainer is disposed over the end of the conduit. An end fitting having an interior space shaped to fit the bulbous portion is then inserted over the retainer to provide a frictional fit between the retainer and the end fitting. The assembly is deficient in that the retainer is necessarily biased outwardly and frictionally engages the interior of the end fitting. This hinders relative rotation movement between the end fitting and the conduit.

SUMMARY OF THE INVENTION AND ADVANTAGES

According to the present invention, there is provided a motion transmitting remote control assembly for transmitting forces in a curved path by a flexible motion transmitting core element. The assembly comprises a conduit and a flexible motion transmitting core element slideably supported by the conduit. The assembly further includes a connector member fixedly disposed about a portion of the conduit. The connector member includes a radially extending flange. The assembly further includes an end fitting adapted for mating engagement with a portion of the connector member. The end fitting engages the flange when disposed on the connector member. The assembly is characterized by retaining means for simultaneously engaging the flange of the connector member and the end fitting and preventing relative axial movement therebetween.

Accordingly, there is provided a motion transmitting remote control assembly including an end fitting adapted for connection to a conduit. The end fitting and conduit are easily installed and relative axial movement therebetween is prevented while allowing for relative rotational movement therebetween.

FIGURES IN THE DRAWINGS

Other advantages of the present invention will be readily appreciated as the same becomes better understood by reference to the following detailed description when considered in connection with the accompanying drawings wherein.

DETAILED DESCRIPTION OF THE DRAWINGS

Figure 1:
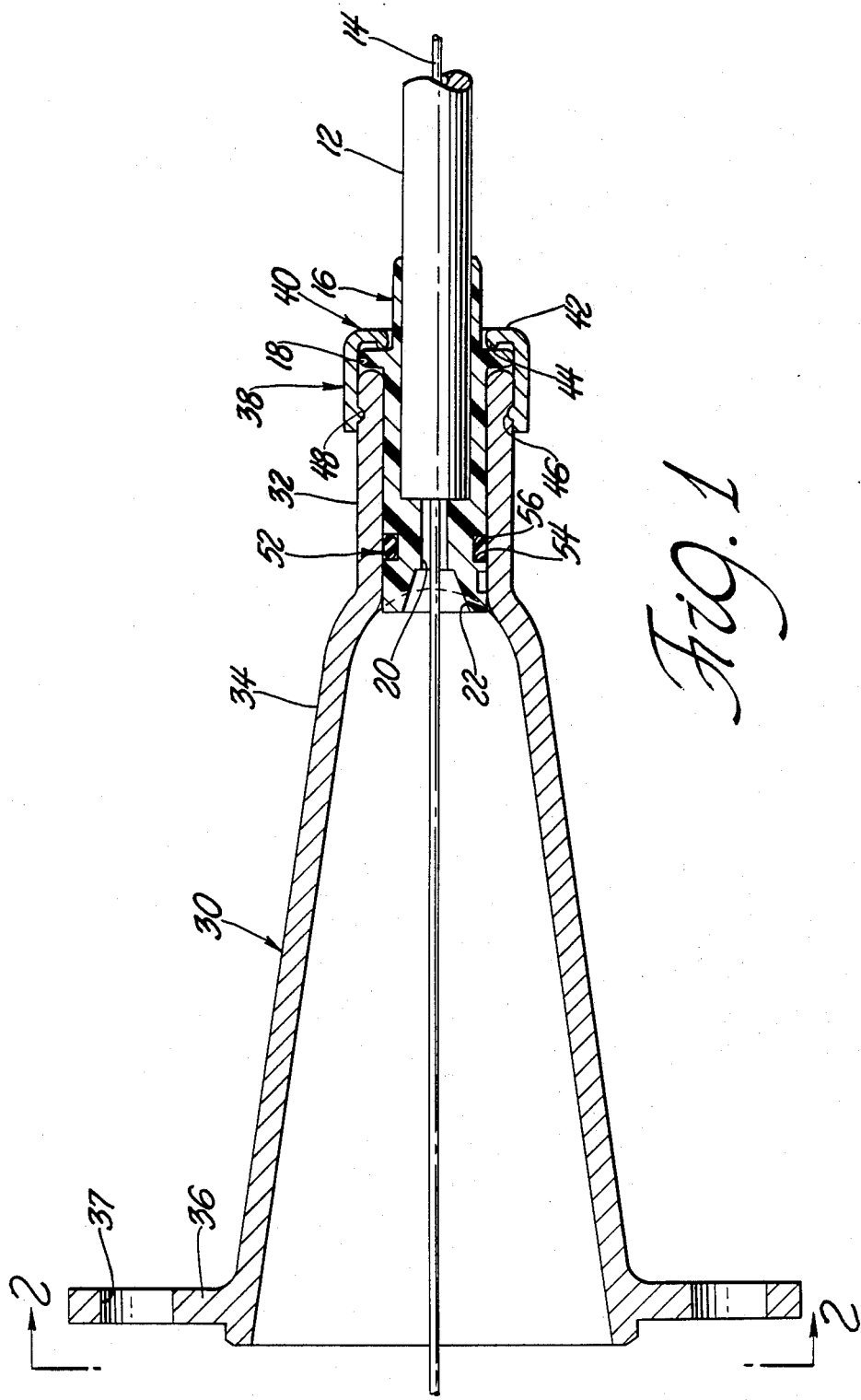
FIG. 1 is a side view partially in cross section of the preferred embodiment of the instant invention.
Figure 2:
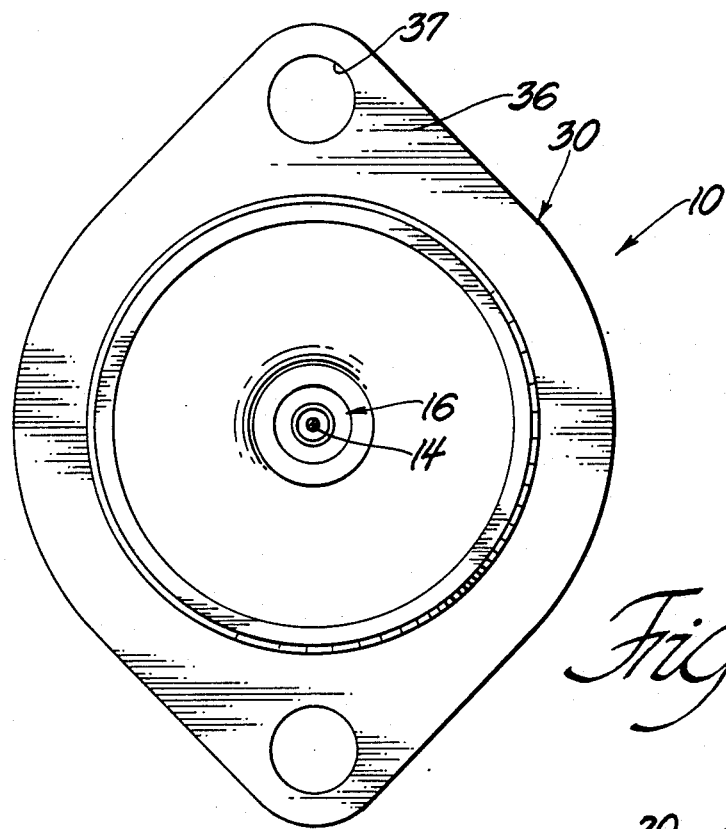
FIG. 2 is an end view taken along lines 2—2 of FIG. 1.
Figure 4:
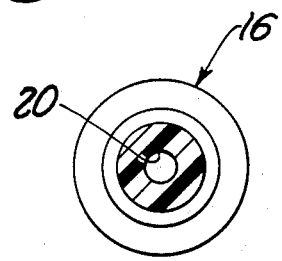
FIG. 4 is a cross-sectional view taken along lines 4—4 of FIG. 3.
Figure 3:
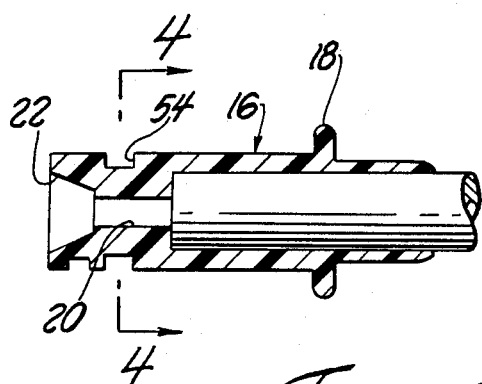
FIG. 3 is a side view partially in cross section of a portion of the preferred embodiment.

A motion transmitting remote control assembly of the type for transmitting forces in a curved path by a flexible motion transmitting core element is generally shown at 10 in the Figures.

The assembly 10 includes a conduit 12. The conduit 12 is preferably of the type having an inner liner of organic polymeric material. The inner liner or tube is surrounded by a plurality of long lay wires helically wrapped thereabout. An exterior casing of organic polymeric material is disposed about the long lay wires. The conduit 12 may further include a fitting (not shown) for mounting the conduit 12 to a support structure at one end.

The assembly 10 further includes a core element 14. The core element 14 is flexible. The core element 14 is slideably supported by the conduit 12.

A connector member, generally indicated at 16, is fixedly disposed about a portion of the conduit 12. That is, the connector member 16 is preferably disposed about one end of the conduit 12 and a portion of the connection member 16 extends longitudinally from the conduit 12. The connector member includes a radially extending flange 18. The flange 18 is annular, i.e., extends completely about the conduit 12 The connector member 16 further includes an opening 20. The opening 20 includes an enlarged portion 22. The opening 20 receives and slideably supports the core element 14. The diameter of the opening 20, other than the enlarged portion 22, is preferably less than the inside diameter of the conduit 12. The enlarged portion 22 of the opening 20 is frustoconical in shape, having the smaller diameter of the cone located near the conduit 12. The frustoconical portion 22 allows for swiveling movement of the core element 14.

The assembly 10 further includes an end fitting 30. The end fitting 30 is adapted for mating engagement with a portion of the connector member 16. Specifically, the end fitting 30 includes a cylindrical portion 32 which engages the outer surface of the connector member 16. Further, the end fitting 30 includes a frustoconical portion 34 extending from the cylindrical portion 32 axially away from the conduit 12 and connector member 16. The end of the cylindrical portion 32 of the end fitting 30 engages the flange 18 of the connector member 16 when the end fitting 30 is disposed on the connector member 16.

The end fitting 30 includes a pair of radially extending mounting flanges 36 for mounting the end fitting 30 to a support structure. The flanges 36 include openings 37 for allowing a fastener, such as a bolt (not shown) to pass therethrough and secure the end fitting 30 to a support structure (not shown).

The assembly 10 further includes retaining means or a retainer generally indicated at 38. The retaining means 38 is for simultaneously engaging the flange 18 of the connector member 16 and the end fitting 30 and preventing relative axial movement therebetween while allowing for relative rotational movement therebetween. The retainer 38 includes a radial extending annular abutment portion, generally indicated at 40, for engaging the flange 18 of the connector member 16. The abutment portion 40 comprises an annular radially extending shoulder 42. An annular ridge 44 is disposed on the shoulder 42 and extends axially therefrom. The ridge 44 engages the flange 18 and spaces the shoulder 42 from the flange 18 while the retaining means simultaneously engages the flange 18 and the end member 30. The ridge 44 further limits free play of the assembly 10.

The retainer 38 further includes a radially extending lip 46. The end fitting 30 further includes a radially extending annular groove 48. The lip 46 is disposed in the groove 48 for locking the end fitting 30 on to the connector member 16 to prevent relative axial movement therebetween. This connection permits relative rotational movement between the connector member 16 and the retainer 38. The end fitting 30 is also free to rotate.

The assembly 10 further includes sealing means generally indicated at 52. The sealing means 52 is disposed between the connector member 16 and the end fitting 30 for preventing fluid from passing therebetween. Specifically, the connector member 16 includes a radially extending annular channel 54 and an O-ring seal 56 disposed in the channel 54. The O-ring seal 56 is disposed in the channel 54 and engages the end fitting 30 at the cylindrical portion 32 which overlaps the connector member 16.

To install the conduit 12 to the end member 30, the conduit 12 having the connector member 16 thereon is positioned properly with respect to the support structure. The end fitting 30 is then fitted over the connector member 16 until the cylindrical portion 32 engages the flange 18. The retainer 38 is then slid to the left as viewed in FIG. 1 until the lip 46 is received in the groove 48 and the ridge 44 engages the flange 18. The end fitting 30 is thereby locked into position and relative axial movement between the end fitting 30 and conduit 12 is prevented. This arrangement still allows for relative rotational movement between the end fitting 30 and the conduit 12. Also, the retainer 38 is free to rotate. Further, when the end fitting 30 is disposed over the connector member 16, the O-ring seal 54 simultaneously engages the connector member 16 and the cylindrical portion 32 of the end fitting 30 for preventing fluid flow therebetween.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A motion transmitting remote control assembly of the type for transmitting forces in a curved path by a flexible motion transmitting core element, said assembly (10) comprising:
   a conduit (12);
   a flexible motion transmitting core element (14) slideably supported by said conduit;
   a connector member (16) fixedly disposed about a portion of said conduit (12), said connector member including a radially extending flange (18);
   an end fitting (30) adapted for mating engagement with a portion of said connector member (16), said end fitting (30) engaging said flange (18) when disposed on said connector member (16);
   said assembly (10) characterized by retaining means (38) for simultaneously engaging said flange (18) of said connector member (16) and said end fitting (30) and for preventing relative axial movement between said connector member (16) and said end fitting (30) while permitting relative rotational movement therebetween.

2. An assembly as set forth in claim 1 further characterized by said retaining means (38) including a radially extending annular abutment portion (40) for engaging said flange.

3. An assembly as set forth in claim 2 further characterized by said end fitting (30) including a radially extending groove (48), said retaining means (38) including a radially extending lip (46), said lip (46) disposed in said groove (48).

4. An assembly as set forth in claim 3 further characterized by said assembly including sealing means (52) disposed between said connector member (16) and said end fitting (30) for preventing fluid from passing therebetween.

5. An assembly as set forth in claim 4 further characterized by said connector member (16) including a radially extending annular channel (54), and said sealing means (52) comprising an O-ring seal (56), said O-ring seal (56) disposed in said radially extending annular channel (54).

6. An assembly as set forth in claim 5 further characterized by end fitting (30) including radially extending mounting flanges (36) for mounting said end fitting (30) to a support structure.

7. An assembly as set forth in claim 6 further characterized by said abutment portion (40) comprising a radially extending shoulder (42) and an annular ridge (44) disposed on said shoulder and extending axially to engage said flange (18) to space said shoulder (42) from said flange (18).

8. An assembly as set forth in claim 7 further characterized by said end fitting (30) comprising a cylindrical portion (32) for engaging said connector member and a frustoconical portion (34) extending longitudinally away from said connector member (16).

9. An assembly as set forth in claim 8 further characterized by said connector member having an opening (20) therethrough for slideably supporting said core element, said opening (20) having an enlarged portion (22) for permitting swiveling movement of said core element (14).

* * * * *